United States Patent [19]

Ward et al.

[11] 4,205,976
[45] Jun. 3, 1980

[54] THERMAL TOUGHENING OF GLASS

[75] Inventors: Peter Ward, Ashton-in-Makerfield; Geoffrey M. Ballard, St. Helens, both of England

[73] Assignee: Pilkington Brothers Limited, St. Helens, England

[21] Appl. No.: 966,634

[22] Filed: Dec. 5, 1978

[30] Foreign Application Priority Data

Dec. 9, 1977 [GB] United Kingdom ............... 51390/77

[51] Int. Cl.² ............................................. C03B 27/00
[52] U.S. Cl. ........................................ 65/114; 65/104; 65/348; 65/351
[58] Field of Search ................. 65/104, 114, 116, 348, 65/349, 351; 165/104 M, 104 F

[56] References Cited

U.S. PATENT DOCUMENTS

| | | | |
|---|---|---|---|
| 3,536,464 | 10/1970 | Seymour | 65/114 |
| 3,706,544 | 12/1972 | Michalik | 65/116 |
| 4,113,458 | 9/1978 | Cross | 65/114 |

*Primary Examiner*—Arthur D. Kellogg
*Attorney, Agent, or Firm*—Burns, Doane, Swecker & Mathis

[57] ABSTRACT

A glass sheet is thermally toughened by heating the sheet to a temperature near to its softening point and then lowering the sheet into a gas-fluidized bed of particulate material. A void region is established beneath the lower edge of the sheet as it is initially immersed in the fluidized bed.

7 Claims, 5 Drawing Figures

THERMAL TOUGHENING OF GLASS

BACKGROUND OF THE INVENTION

1. Field of the Invention

This invention relates to the thermal toughening of glass and more particularly to a method and apparatus for the thermal toughening of a glass sheet in which the sheet is heated to a temperature near to its softening point and the hot sheet is lowered into a gas-fluidised bed of particulate material so that heat exchange between the surfaces of the glass sheet and the fluidised material induces toughening stresses in the glass.

2. Description of the Prior Art

The fluidised bed toughening process has been found to be effective with all glass thicknesses of practical interest, but in the case of thinner glass sheets a difficulty can arise in that the glass sheets may fracture on immersion in the fluidised bed of particulate material.

It is beleived that one important cause of fracture of thin glass sheets in the fluidised bed toughening process is the fact that the leading edge of the glass sheet cools at too rapid a rate as compared with the remainder of the glass sheet. Such a rapid of cooling of the leading edge of the glass puts the leading edge into a high degree of tension. Since glass stressed in tension is weak the glass sheet readily fractures and the fracture generally propagates from any finishing flaws which may be present in the leading edge of the glass sheet.

The incidence of such fractures can be reduced, or avoided completely, by producing a high quality finish on the leading edge of the sheets so as to eliminate flaws. However the necessary edge finish is expensive to produce.

The incidence of fracture of thin glass sheets in the fluidised bed toughening process can also be reduced by heating the sheets, before quenching, to a temperature which is so high that the leading edge of each glass sheet is sufficiently plastic to withstand the transient tensile stresses which arise in the leading edge of the glass sheet when it is immersed in the fluidised bed. However the glass sheets have to be heated to a temperature higher than is necessary to achieve the required degree of toughening and at this higher temperature thin glass sheets are sufficiently plastic to be liable to overall shape distortion during the toughening process.

It is an object of the present invention to minimise the problem of glass fracture in the fluidised bed toughening process so as to obtain a reduced incidence of fracture of thin glass sheets in particular; or in the case of a process in which the incidence of fracture is acceptable to enable the process to be operated using glass sheets having a poorer quality and less expensive edge finish; or to enable processing of the glass sheets at a lower temperature such that the problem of overall shape distortion is minimised.

SUMMARY

The invention provides a method of thermally toughening a glass sheet in which the glass sheet is heated to a temperature near to its softening point and then lowered into a gas-fluidised bed of particulate material. A void region is established beneath the lower edge of the glass sheet as it is initially immersed in the fluidised bed.

Preferably the gas fluidised bed of particulate material is maintained in a quiescent uniformly expanded state of particulate fluidisation as the glass sheet is lowered into the bed.

In one method according to the invention the void region is established beneath the lower edge of the glass sheet by shielding that region from upward flow of fluidising gas.

The invention also provides apparatus for thermally toughening a glass sheet comprising a container for a gas fluidised bed of particulate material and means for suspending a glass sheet and lowering that sheet into the container, characterised by gas flow modifying means for positioning at a distance beneath the lower edge of the sheet to establish a void region beneath the lower edge of the glass sheet when it is immersed in the fluidised bed.

In a preferred embodiment the gas flow modifying means comprises an elongated shielding member arranged below and extending parallel to the lower edge of the glass sheet. Preferably, the shielding member is tubular and has a triangular cross-section with the apex of the triangle directed downwardly. It has been found that in order to obtain the best effect there is an optimum distance between the shielding member and the lower edge of the glass sheet which is related to the maximum width of the shielding member. The shielding member of triangular cross-section is particularly effective if the distance between the lower edge of the glass sheet and the base of the triangular cross-section of the shielding member is less than or equal to the width of that base.

BRIEF DESCRIPTION OF THE DRAWINGS

An embodiment of the invention will now be described by way of example with reference to the accompanying drawings in which.

DESCRIPTION OF THE PREFERRED EMBODIMENT

Figures 1, 2:
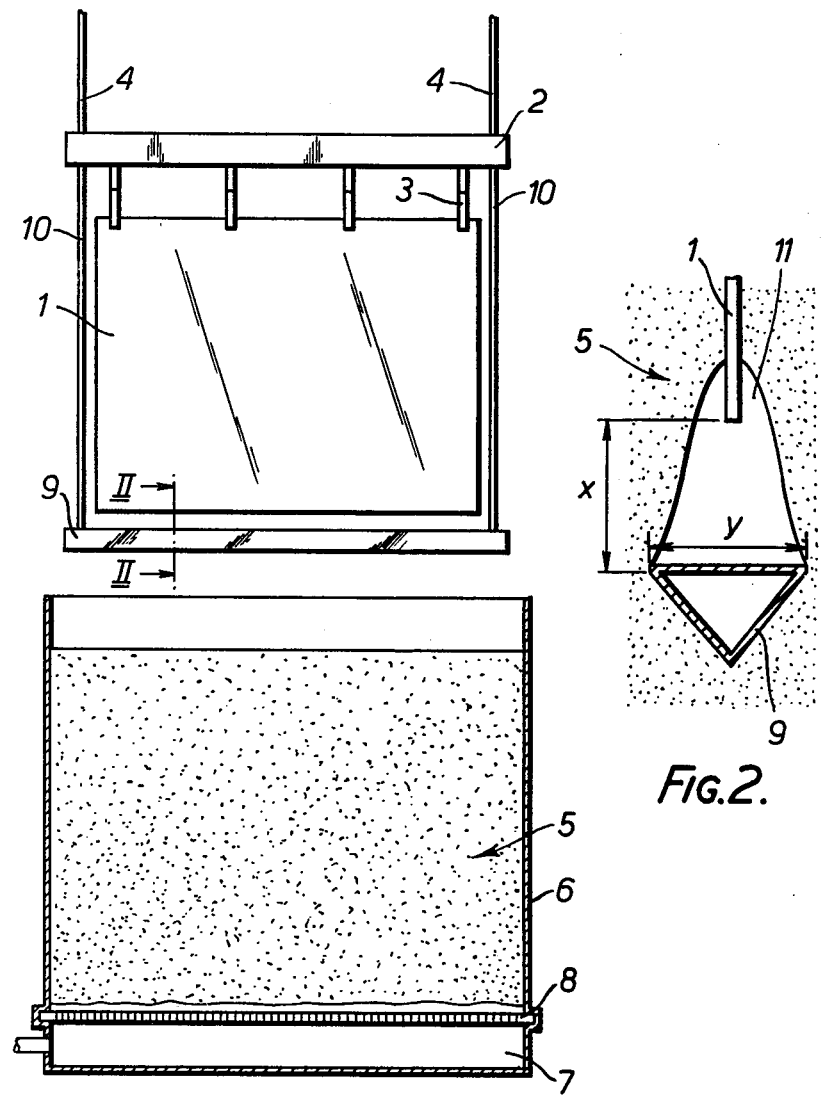
FIG. 1 is a diagrammatic front elevation of apparatus for the toughening of a glass sheet in a gas-fluidised bed of particulate material including a shielding member located in accordance with the invention below the lower edge of the glass sheet.
FIG. 2 is a cross section along the line II—II of FIG. 1, and FIGS. 3, 4 and 5 are graphs illustrating the effect of varying the distance by which shielding members of various widths are located below the lower edge of the glass sheet.

As shown in FIG. 1 of the drawings a glass sheet 1 is suspended from a tong bar 2 by tongs 3. The tong bar 2 is carried from hoist cables 4 by means of which the tong bar 2 can be lowered to immerse the glass sheet 1 in a bed of gas-fluidised particulate material. The bed 5 is held in a container 6 and fluidising gas is fed into the bed 5 from a plenum chamber 7 through a membrane 8 forming the base of the container 6, which membrane 8 comprises a number of layers of low permeable paper across which there is a relatively high pressure drop. The gas-fluidised bed of particulate material may be maintained in a quiescent uniformly expanded state of particulate fluidisation by regulation of the velocity of fluidising gas through the bed between the gas velocity which produces incipient fluidisation and that which produces maximum expansion of the bed.

An elongated tubular shielding member 9 of triangular cross-section is suspended by rods 10 from the tong bar 2. The apex of the triangular cross-section points downwardly away from the lower edge of the glass sheet. The maximum width of the member 9, which is the width of the base of the cross-section, is designated "y" and the base is spaced at a distance "x" below the lower edge of the glass sheet. The shielding member 5 extends beneath and parallel to the full length of the glass sheet.

In use of the apparatus of FIG. 1 for toughening of the glass sheet 1 the glass sheet is heated to a temperature near to its softening point, for example a temperature in the range 620° C. to 680° C. for soda-lime-silica glass, and is then lowered into the bed 5 of gas-fluidised particulate material, which is maintained at a temperature in the range 30° C. to 150° C.

As shown in FIG. 2 of the drawings as the lower edge of the glass sheet 1 enters the bed 5 the shielding member 9 modifies the flow of fluidising gas in the bed 5 so as to establish a void region 11 which extends above the shielding member 9 and envelopes the lower edge of the glass sheet 1. The void region 11 is in the form of a bubble of the fluidising gas which is substantially free of entrained particulate material. The rate of cooling of the lower edge of the glass sheet is considerably reduced by the presence of the void region 11, which thereby avoids the setting up of tensile stresses in the lower edge of the glass sheet such as would normally occur due to the greater rate of cooling of the lower edge of the glass sheet and which could otherwise cause fracture of the glass sheet upon entry into the fluidised bed.

The void region disperses subsequent to entry of the lower edge of the glass sheet into the fluidised bed 5 so that all of the major surfaces of the glass sheet are then subjected to cooling by the particulate material of the fluidised bed to bring about a uniform overall toughening of the glass sheet including the region of the glass sheet adjacent its lower edge.

Examples of the method of the invention are as set out below. In each of Examples 1 to 3 the fluidised bed is of porous γ-alumina having a particle density of 2.2 grms/cm$^3$ and a particle size in the range 20 to 120 microns, the average particle size being 64 microns, and fluidising gas was fed into the plenum chamber 7 of the container 6 so as to establish an upward flow of fluidising gas through the membrane 8. The temperature of the fluidised bed was in the range 50° C. to 80° C. Glass sheets 3 mm thick had their lower edges edge-finished by being fully ground using a 400 diamond grit wheel. The sheets were heated and then lowered into the fluidised bed at a speed of 0.3 m/s.

Width "y" of shielding member 9 = 51 mm
Included Angle at apex of member 9 = 60°
Fluidising gas velocity = 11 mm/s To provide comparative figures a number of glass sheets were first processed without the use of the shielding member 9.

Then a number of glass sheets were heated in a furnace while suspended from the tong bar 2 with the shielding member 9 in position at various spacings "x" below the lower edge of the sheet. When the base of the shielding member 9 was spaced only about 12 mm from the lower edge of the glass it was found that the shielding member 9 prevented adequate heating of the lower edge of the glass sheet in the furnace so that a poor yield of only 14% was obtained because of the lower temperature of the bottom edge of the glass sheet. This difficulty was avoided by placing reflective silver foil on the upper surface of the shielding member 9 to reflect additional heat towards the lower edge of the glass sheet.

This difficulty can also be avoided by heating the glass sheet prior to positioning the shielding member below the glass sheet.

The results obtained with no shielding member and with different spacings "x" of the base of the shielding member from the lower edge of the glass sheet were as set out in Table I. The yield figures represent the number of unfractured toughened sheets obtained as a percentage of the total number of sheets processed.

TABLE I

| Shielding Member Spacing x | Temperature of lower edge of glass sheet | Yield % |
|---|---|---|
| No shielding Member | 625 | 33 |
| 12mm | 623 | 100 |
| 25mm | 633 | 80 |
| 50mm | 625 | 100 |
| 76mm | 634 | 75 |
| 89mm | 629 | 17 |

Example 2 and 3 illustrate the use of shielding members 9 of different maximum width.

EXAMPLE 2

Width "y" of shielding member 9 = 12 mm
Included angle at apex of member 9 = 60°
Fluidising gas velocity = 5.4 mm/S The results obtained with no shielding member 9 and with different spacings "x" are set out in Table II.

TABLE II

| Shielding member Spacing x | Temperature of lower edge of glass sheet °C. | Yield % |
|---|---|---|
| No shielding member | 630 | 42 |
| No shielding member | 625 | 33 |
| 6.4mm | 629 | 100 |
| 12mm | 626 | 100 |
| 19mm | 628 | 0 |

EXAMPLE 3

Width "y" of shielding member 9 = 64 mm
Included angle at apex of member 9 = 60°
Fluidising gas velocity = 5.4 mm/S The results obtained with no shielding member 9 and with different spacings "x" are set out in Table III.

TABLE III

| Shielding Member Spacing x | Temperature of lower edge of glass sheet °C. | Yield % |
|---|---|---|
| No shielding member | 630 | 42 |
| No shielding member | 625 | 33 |
| 32mm | 630 | 99 |
| 64mm | 628 | 100 |
| 83mm | 628 | 100 |
| 108mm | 630 | 91 |
| 127mm | 632 | 0 |

Figure 3:
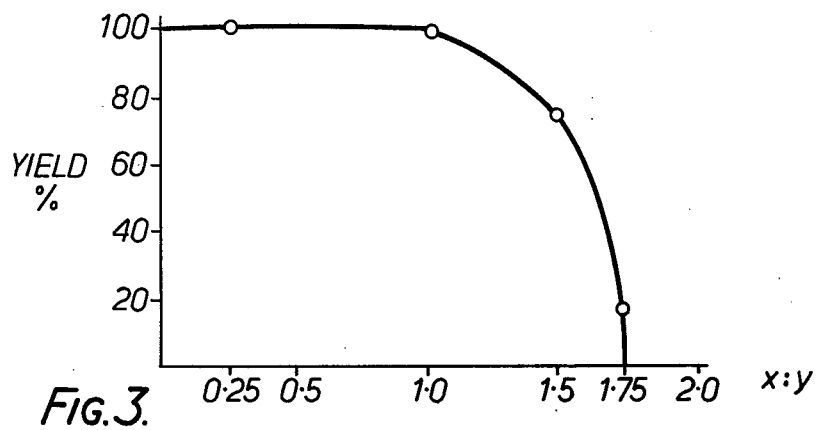
Figure 4:
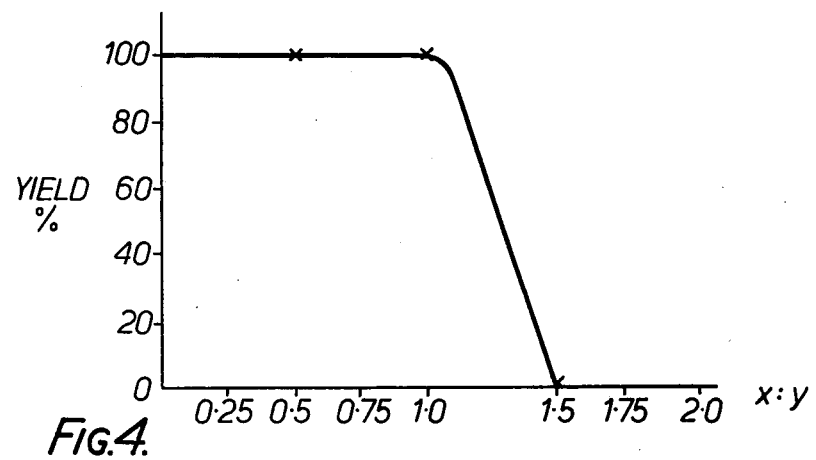
Figure 5:
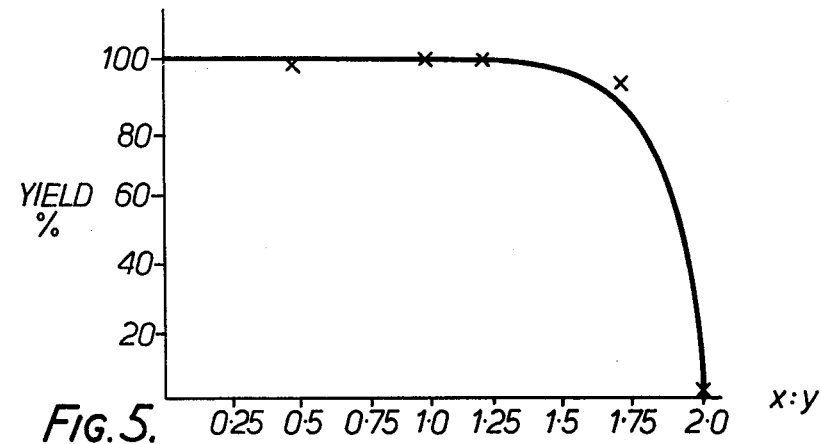

FIGS. 3, 4 and 5 are graphs of percentage yield plotted against the ratio x/y for each of the results of Tables I, II and III respectively. The graphs show that whenever the ratio is less than 1, that is the spacings "x" is less than or equal to the width "y", a yield of the order of 100% is obtained. Significantly lower yields obtained is the absence of the shielding member 9.

Comparison of the graphs of FIGS. 3, 4 and 5 also indicates that the maximum effective spacing "x" increases with increasing width "y" of the shielding member 9. FIG. 4 shows that when the width "y" was 12 mm the maximum effective ratio x/y was about 1, and there was a rapid fall off in yield at spacings x greater than that equal to the width y.

FIG. 5 shows that when the width y was 64 mm there was a high yield at values of the ratio x/y up to 1.5.

Similar results were obtained from tests carried out on glass sheets of 2.3 mm thickness. By way of example using a triangular-section shielding member 9 whose base is 19 mm wide which has an included angle of 30° at its apex, and is suspended with its base 19 mm below the lower edge of the glass, a yield of 100% was obtained when quenching a series of glass sheets, having a lower edge temperature up to 660° C., in a fluidised bed of porous γ-alumina. The fluidised bed had a temperature in the range 50° to 80° C. This compared with a yield of only 40% obtained without the use of the shielding member 9.

Similarly using a triangular-section shielding member 9 whose base is 25 mm wide and which has an included angle of 60° at its apex, and is suspended with its base 25 mm below the lower edge of glass sheets 2.3 mm thick, a yield of 88% was obtained when quenching the glass sheets, having a lower edge temperature of about 640° C., in a fluidised bed of γ-alumina whose temperature was in the range 50° to 80° C. The yield obtained without use of the shielding member 9 was only 8%.

Glass sheets 3 mm thick heated to various temperatures were quenched in a fluidised bed of γ-alumina without the use of a shielding member, and also using a triangular-section shielding member whose base was 51 mm wide and was spaced 51 mm below the lower edge of the glass sheets. The fluidising gas velocity used was 11 mm/S. The results are set out in Table IV.

TABLE IV

| Temperature of Lower Edge of Glass sheet °C. | Yield % | |
|---|---|---|
| | No Shielding Member | With Shielding Member |
| 615–620 | 0 | 50 |
| 620–625 | 25 | 80 |
| 625–630 | 42 | 100 |
| 630–635 | 77 | 100 |

Table IV shows that the shielding member can be used not only to increase yield figures at a given temperature but can also maintain the level of yield at lower glass temperatures. By using lower glass temperatures the problem of loss of overall glass shape is alleviated.

A clear indication that the use of the invention maintains yield with a poorer edge finish on the glass sheets was obtained by quenching 3.0 mm thick sheets having a cut but unfinished lower edge into a fluidised bed of γ-alumina. The results are set out in Table V.

TABLE V

| Shielding member | | Temperature of lower edge of glass sheet °C. | Yield % |
|---|---|---|---|
| Width y | Spacing x | | |
| No shielding member | | 665 | 0 |
| 12mm | 12mm | 661 | 54 |
| 64mm | 51mm | 664 | 50 |

Although the resulting yields of 54% and 50% were a significant improvement over the zero yield without a shielding member, this would not be good enough in commercial operation of the process. The indication was that it could be possible to use a poorer and therefore less expensive finish of the lower edge than is normally necessary to obtain a high commercial level of yield. Further tests were carried out using 2.3 mm thick glass sheets having an arrissed lower edge as compared with glass sheets of similar thickness having a high quality double ground lower edge finish. The arrissed edge finish is one in which the cut edges of the glass are chamferred by grinding.

The glass sheets having an arrissed lower edge at a temperature of 640° C. were quenched in a fluidised bed of γ-alumina using a shielding member 9 whose maximum width was 25.4 mm and which was spaced 25.4 mm below the lower edge of the glass sheets. The yield was 83%, which was comparable with the yield obtained from quenching of the glass sheets having a high quality double ground lower edge finish without use of the shielding member 9.

We claim:

1. A method of thermally toughening a glass sheet comprising heating the glass sheet to a temperature near to its softening point, lowering the hot glass sheet into a gas-fluidised bed of particulate material, and establishing a void region beneath the lower edge of the glass sheet as it is initially immersed in the fluidised bed.

2. A method as claimed in claim 1, wherein the gas-fluidised bed of particulate material is maintained in a quiescent uniformly expanded state of particulate fluidisation as the glass sheet is lowered into the bed.

3. A method as claimed in claim 1 or claim 2, wherein said void region is established beneath the lower edge of the glass sheet by shielding that region from upward flow of fluidising gas.

4. Apparatus for thermally toughening a glass sheet comprising a container and means for establishing a gas-fluidised bed of particulate material therein, means for suspending a glass sheet and lowering that sheet into the container, and gas-flow modifying means positionable in the gasfluidised bed within said container and including an elongated shielding member having a width transverse to the sheet positioned parallel to and at a distance beneath the lower edge of the sheet for establishing a void region beneath the lower edge of the glass sheet when the sheet is immersed in the fluidised bed.

5. Apparatus as claimed in claim 4, wherein the shielding member is tubular and has a triangular cross-section with the apex of the triangle directed downwardly.

6. Apparatus as claimed in claim 4 or 5, wherein the distance between the lower edge of the glass sheet and the shielding member is less than or equal to the width of the shielding member.

7. Apparatus for thermally toughening a glass sheet comprising a container and means for establishing a gas-fluidized bed of particulate material therein, means for suspending a glass sheet and lowering the sheet into the container, and gas flow modifying means positionable in the gas-fluidised bed within said container and including an elongated shielding member having a width transverse to the sheet positioned parallel to and beneath the lower edge of the sheet for establishing a void region in the form of a bubble of fluidizing gas above said shielding member up to the lower edge of the glass sheet while the sheet is being immersed in the fluidized bed, the distance of said shielding member beneath the lower edge of the sheet being less than or equal to the width of the shielding member.

* * * * *